(No Model.) 6 Sheets—Sheet 1.
S. W. LADD.
TACK SEPARATING AND FEEDING MECHANISM.
No. 510,978. Patented Dec. 19, 1893.
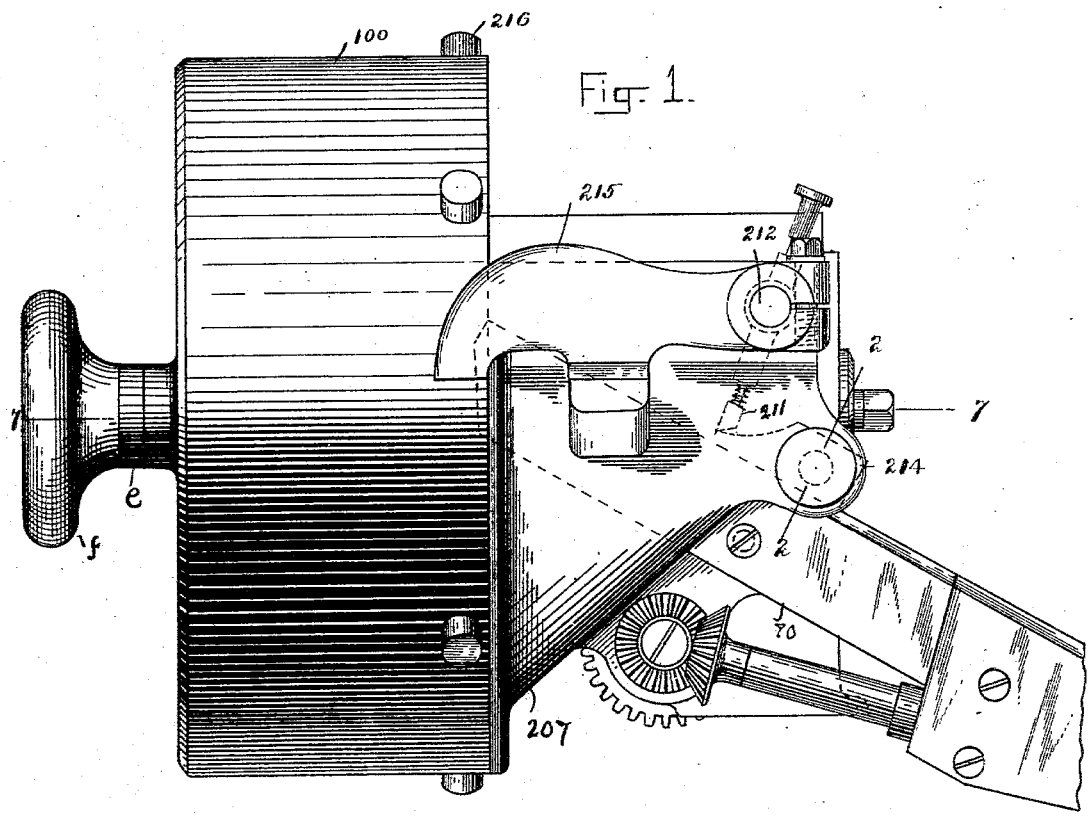
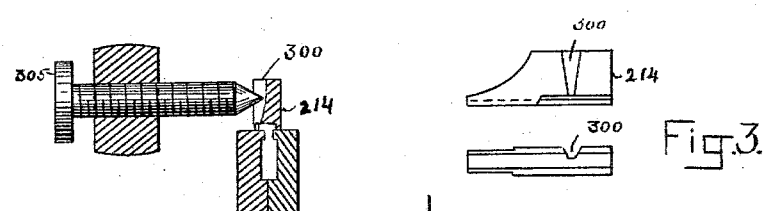
WITNESSES:
Chas. S. Gooding
E. E. Hamill
INVENTOR:
Sherman W. Ladd
by C. N. B. Tuttle
Atty.

(No Model.)  6 Sheets—Sheet 2.

S. W. LADD.
TACK SEPARATING AND FEEDING MECHANISM.

No. 510,978. Patented Dec. 19, 1893.

WITNESSES:
Chas N Gooding
E. E. Hamill

INVENTOR:
Sherman W Ladd
by C.B. Tuttle
Atty.

(No Model.) 6 Sheets—Sheet 3.
S. W. LADD.
TACK SEPARATING AND FEEDING MECHANISM.

No. 510,978. Patented Dec. 19, 1893.

Fig-5.

WITNESSES:
Chas. S. Gooding
E. E. Hamill

INVENTOR:
Sherman W. Ladd
by C. B. Inttto
Atty (No Model.) 6 Sheets—Sheet 4.
S. W. LADD.
TACK SEPARATING AND FEEDING MECHANISM.
No. 510,978. Patented Dec. 19, 1893.
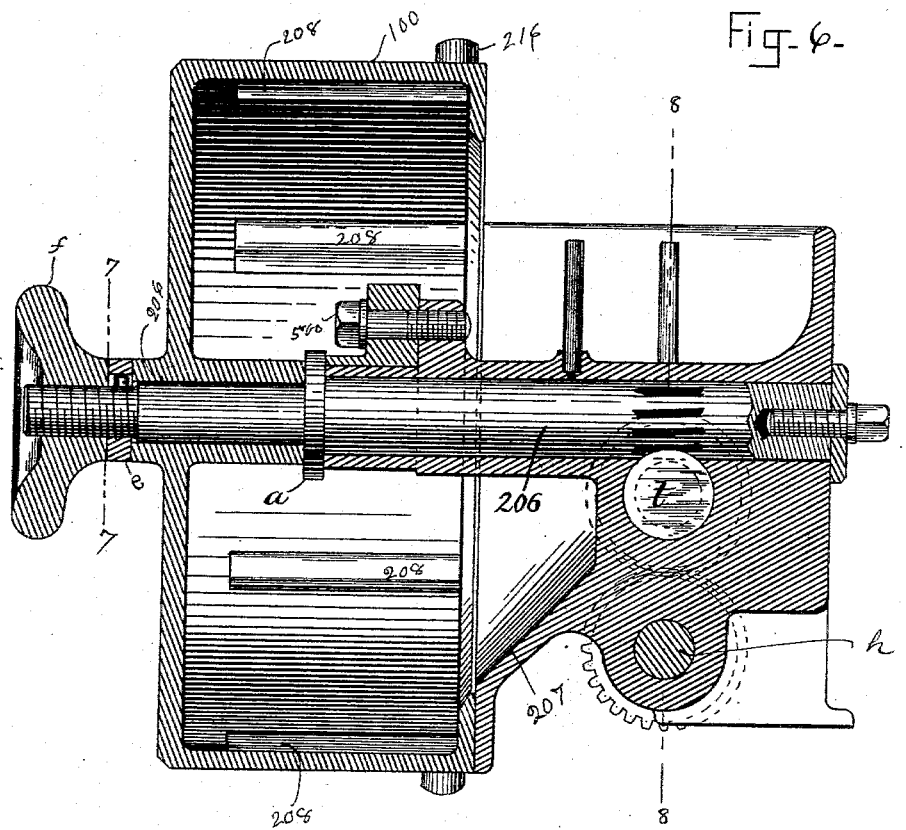
Fig-6-
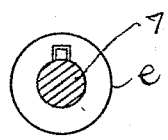
Fig-7-
WITNESSES:
Chas. V. Gooding
E. E. Hamill
INVENTOR
Sherman W. Ladd
by: C. B. Tutts
Atty.

(No Model.) 6 Sheets—Sheet 5.
S. W. LADD.
TACK SEPARATING AND FEEDING MECHANISM.
No. 510,978. Patented Dec. 19, 1893.

WITNESSES:
Chas. N. Gooding
E. E. Hamill

INVENTOR:
Sherman W. Ladd
by C. B. Tuttle
Att'y (No Model.)  6 Sheets—Sheet 6.

S. W. LADD.
TACK SEPARATING AND FEEDING MECHANISM.

No. 510,978. Patented Dec. 19, 1893.

WITNESSES:
Chas. J. Gooding.
E. E. Hamill.

INVENTOR:
Sherman W. Ladd
by C. B. Tuttle
Att'y

UNITED STATES PATENT OFFICE.

SHERMAN W. LADD, OF SOMERVILLE, MASSACHUSETTS, ASSIGNOR TO THE CONSOLIDATED HAND METHOD LASTING MACHINE COMPANY, OF NASHUA, NEW HAMPSHIRE.

TACK SEPARATING AND FEEDING MECHANISM.

SPECIFICATION forming part of Letters Patent No. 510,978, dated December 19, 1893.

Application filed December 13, 1890. Renewed November 4, 1893. Serial No. 490,007. (No model.)

*To all whom it may concern:*

Be it known that I, SHERMAN W. LADD, of Somerville, in the county of Middlesex and Commonwealth of Massachusetts, have invented certain Improvements in Tack Separating and Distributing Mechanism, of which the following, taken in connection with the accompanying drawings, is a specification.

This invention relates to improvements in mechanism for separating and distributing tacks and other articles capable of being suspended by their heads or similarly enlarged portions and wherein is comprised a hopper for receiving the tacks in bulk and a mechanism for separating the tacks and depositing them, one by one, from the hopper into a nailing tube or other receptacle.

This invention is an improvement on the mechanism described in Letters Patent of the United States No. 423,921. It relates, mainly, to improvements in matters of construction.

Figure 4:
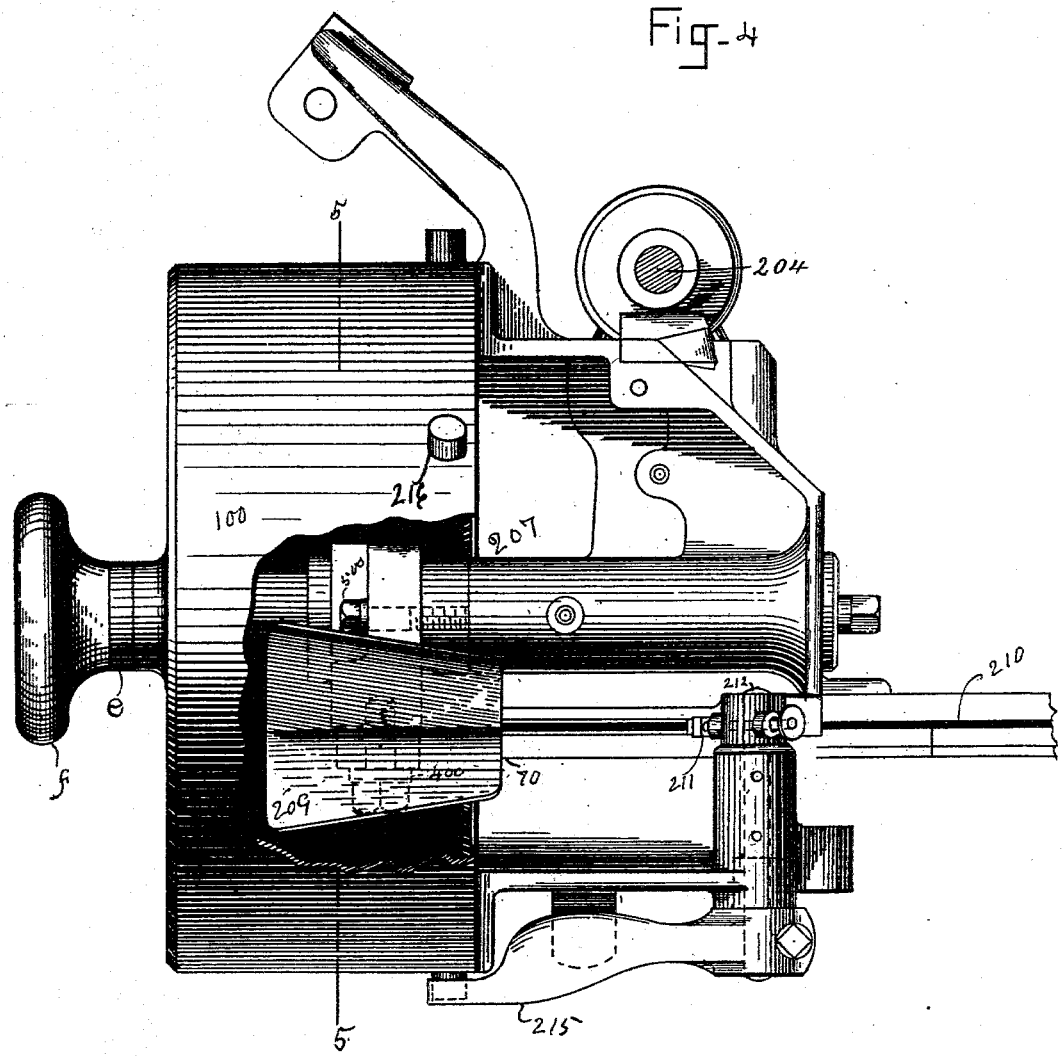
Figure 8:
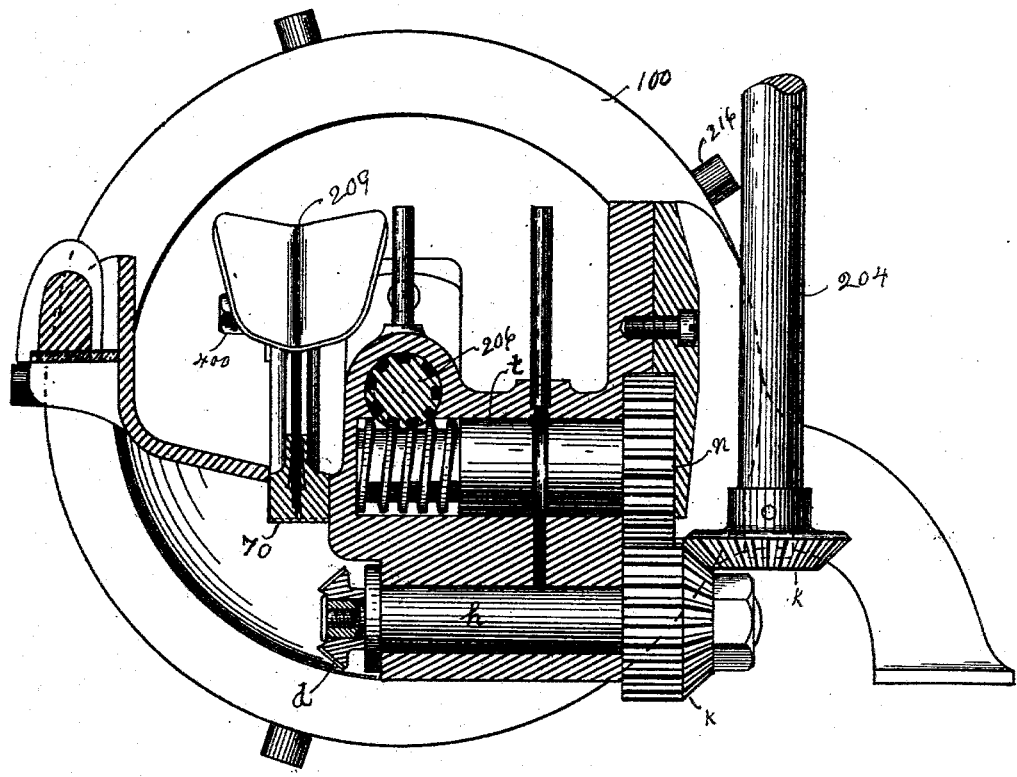
Figure 9:
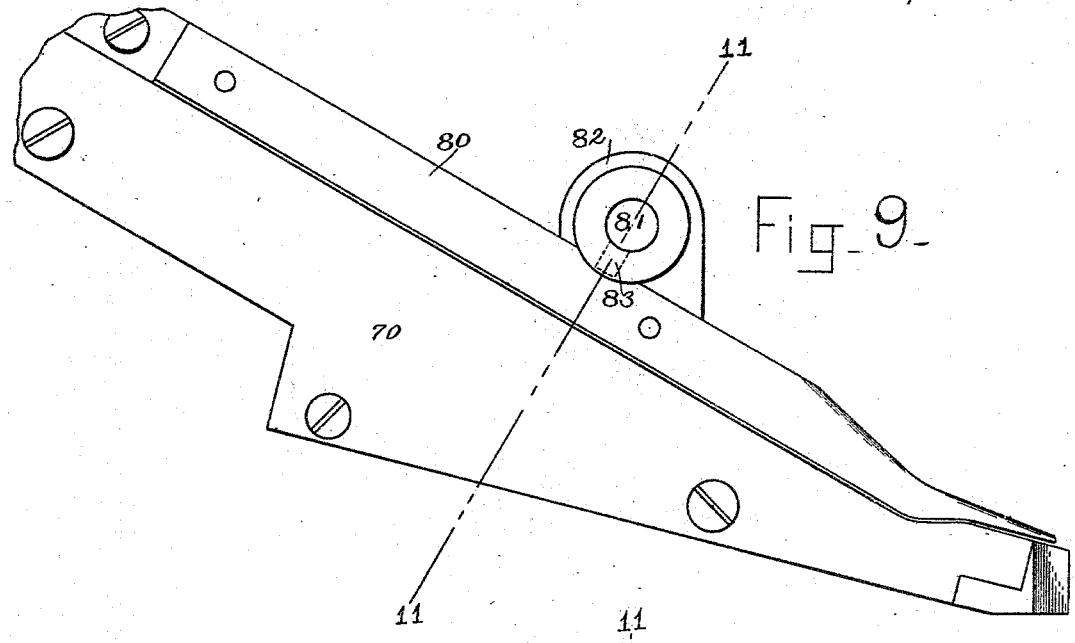
Figure 10:
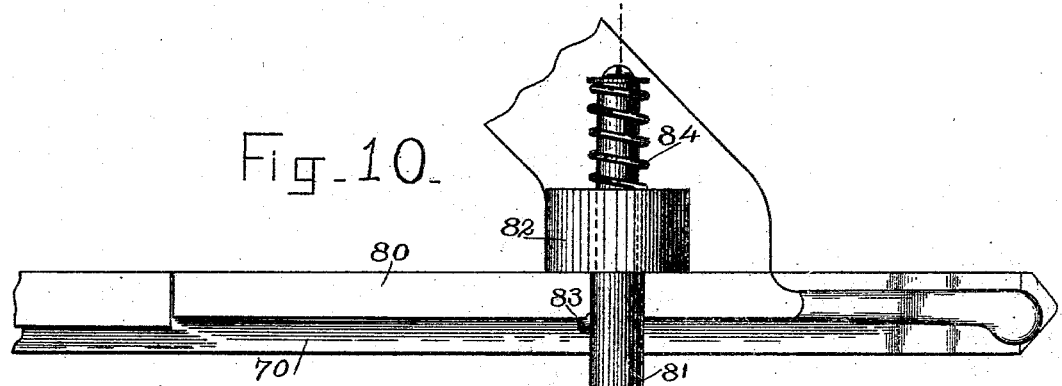
Figure 11:
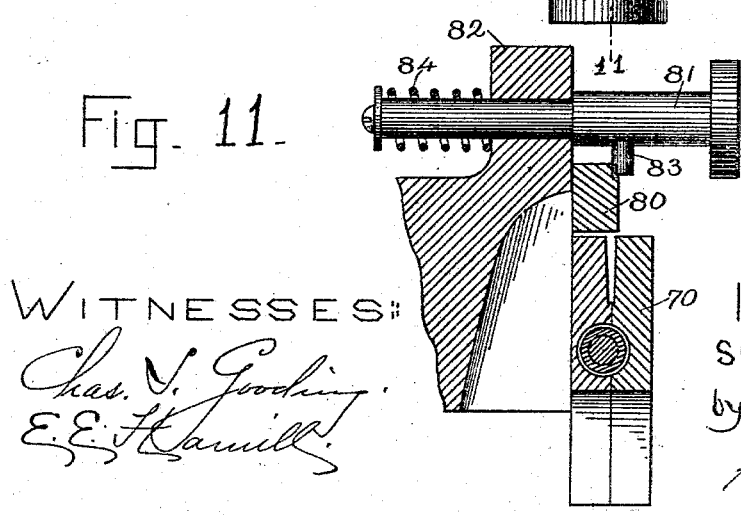

In the drawings, Figure 1 is a side elevation of the tack-hopper, its component and co-operating mechanisms and a portion of the tack raceway. Figs. 2 and 3 are details connected with Fig. 1, Fig. 2 being a section on line 2, 2, of Fig. 1. Fig. 4 is a plan view of Fig. 1. Fig. 5 is a section on line 5, 5, of Fig. 4. Fig. 6 is a sectional view on line 6, 6, of Fig. 5. Fig. 7 is a section on line, 7, 7, of Fig. 6. Fig. 8 is a section on line 8, 8, of Fig. 6. Fig. 9 is a side elevation of the tack raceway. Fig. 10 is a plan view of Fig. 9. Fig. 11 is a section on line, 11, 11, of Fig. 10.

The tack hopper, 100, is mounted loosely on the shaft, 206, and takes its bearing on the shaft intermediate the collar, $a$, (Fig. 6,) which is fixed or formed integral with the shaft, 206, and the collar, $e$, which is arranged to permit longitudinal movement on the shaft, but has a spline connection to revolve with the shaft, 206. Said shaft has a screw-threaded outer end to receive and support the correspondingly screw-threaded nut, $f$. By an obvious turn of the nut, $f$, the collar, $e$, is forced into frictional contact with the bearing sleeve of hopper, 100, so as to compel the hopper, 100, to revolve in unison with shaft, 206, but permit the hopper to stop against obstructing force such as tacks or pieces of tacks wedged between the hopper and its adjacent supporting framework. By thus interposing the collar, $e$, between the nut, $f$, and end-face of the bearing sleeve of tack pot, 100, I obviate a difficulty encountered in the operation of the mechanism described in Letters Patent No. 423,921, viz:—the liability of the nut, $f$, being stopped in unison with the tack-pot, 100, and thus screwed, by reason of the continuing rotary movement of shaft, 206, into binding contact with the pot, 100, and the possible breakage of parts incident thereto. A continuous, rotary movement is imparted to the shaft, 206 from the shaft, 204, (Fig. 8.) To that end, shaft, 204 has its top end connected with any suitable rotary driving mechanism and interposed between the shaft, 204 and the shaft, 206, is a power transmitting mechanism composed of gears, $k$, $k$, $n$, and worm shaft, $t$, arranged all as shown in Fig. 8. It will be understood that the shaft, 204, is introduced in order to illustrate the method of combining this mechanism with a mechanism for lasting boots and shoes described in Letters Patent of the United States No. 423,922, as it is in combination with such a mechanism that this, my present invention, is specifically designed to be used. It will be observed that a worm on the shaft, $t$, engages the shaft, 206, to which end the shaft 206 is recessed to receive the worm of shaft, $t$, as shown in Fig. 8. These engaging parts of the two shafts, and the two shafts themselves, are fully covered and concealed by the supporting framework, all to the end that they may be shielded from bits of broken tacks and thus protected from injury. To the same end a cap is secured over the end-face of gear, $n$, as shown in Fig. 8. The shaft, $h$, has a fixed connection with the gear, $k$, to the end that it may be revolved in unison with the gear, $k$, and on the end of this shaft is a gear, $d$, that engages with a gear, fixed upon the tack distributing worm-shaft.

This tack distributing worm and its gear are not represented in the accompanying drawings, but for a description thereof, reference is had to the said Letters Patent of the United States No. 423,921.

The framework in which are journaled the shafts, 206, h, t, is fashioned with a sort of basin, 207, provided with an inclined face or side, opening into the hopper. To that end the hopper is open, at one side, and revolves with its edge adjacent to and in sliding contact with the basin, 207, as shown in Figs. 1 and 6.

In operation, the tacks are placed into the hopper in bulk and the hopper is provided with ribs, 208, whereon, as the hopper is revolved, the tacks are lifted, in part, and dashed into an inclined pan, 209. Said pan is formed with its two sides converging to form a central trough and the pan is positioned with this trough above the channel of the tack chute, 70, and is pitched on an incline toward the tack chute all to the end that the tacks, when dashed from the hopper ribs, into the pan, shall gravitate downwardly and off the inclined faces of the pan. Obviously, the inclined faces of the pan tend to force the tacks into alignment with the trough channel and consequently into alignment with the receiving groove of the tack chute. Tacks which are thus brought into alignment and slide from the pan, head or point first, are suspended in the chute-raceway-groove with their points downward and their heads bearing upon the top faces of the chute. Tacks which do not strike in the raceway fall into the basin, 207, and thence gravitate to the hopper, to be again lifted and dashed into the pan, as before.

In practice I have found that the best results are secured when the pitch or inclination of the pan, toward the tack chute is determined, with due regard to the weight of the tacks, so that it is desirable to have the pan supported adjustably, to the end that the pitch or inclination thereof, relatively to the tack chute may be varied to suit the particular weight of the tacks, temporarily, in use. To this end the pan is secured to its bracket by a clamp-screw, 400, on which the pan permits tilting movements. The bracket is secured to the framework by a clamp-screw, 500, on which the bracket permits vertical and lateral adjustments, the bracket being, to that end, provided with an opening somewhat larger than the body portion of the clamping screw, all as shown more fully in Fig. 5. Obviously, some of the tacks may be improperly suspended in the raceway and tend to obstruct the downward progress of other tacks. These improperly suspended tacks must be either lifted from the raceway or adjusted and properly suspended to pass downward with the others. On the chute-block, is a bridge, 214, which overhangs the raceway-groove, 210. This bridge obstructs the downward progress of all tacks not properly suspended in the raceway, its head bearing closely on the surface of the chute, its body well down in the raceway, in order to pass under the bridge. Above the bridge is a tripper-arm, 211. This tripper is supported in a rock-shaft, its bottom end preferably grooved to receive the edges of the chute and its end face bearing upon the chute. The tripper permits vertical movement against the spiral spring, (not shown,) to the end that the tripper may be moved along the bridge and chute, passing from one to the other, intermittently. To this end, an intermittent rocking movement is imparted to the shaft, 212. For this purpose, the shaft, 212, is provided with an arm, 215, which extending forward, engages stops, 216, on the hopper and, being lifted thereby, a movement of the shaft, 212, and consequently the tripper, is effected, in one direction. The arm, 215, when released from the stops, 216, drops downwardly by its own specific gravity, thereby effecting a movement of the shaft and consequently the tripper in a reverse direction. See further Letters Patent No. 423,921.

It will be understood that tacks will, at times, become lodged in the raceway after passing under the bridge. It is desirable, therefore, to have the bridge set upon the chute detachably, to the end that it may be readily removed to get at and adjust the tacks. To this end the bridge portion of the chute-cover is composed of a separate piece, shown in Fig. 3. It has its forward end formed for receiving the tripper and in one side thereof is a groove, 300, the side faces whereof are inclined, as shown in Fig. 3, and the back face whereof is inclined, as shown in Fig. 2.

In use, the bridge is set upon the tack chute as shown in Fig. 2. It is held in place by a screw, 305, which, to that end, has a conical point adapted to sit into the groove, 300, and bear upon the face-walls of the groove, so as to hold the bridge in position, longitudinally, and firmly down upon the chute, the bridge being allowed to bear opposite to the screw, 305, against the framework of the machine. This arrangement permits the bridge to be detached by simply withdrawing the screw, 305, and, when set in place again, the forward movement of the screw operates to position and secure the bridge in place. For a similar reason, it is, at times, desirable to remove the cover proper or lid 80 of the chute. To that end also, the lid, 80, is made a distinct piece and detachably connected with the chute. In use, it is placed upon the chute, as shown in Fig. 11. It is held in position by a holding device consisting of the stud, 81, spring, 84, and pin, 83, a niche being formed in one side of the lid to receive the pin, 83, as shown. To remove or adjust the lid, the operator, placing one hand upon the stud, 81, pulls it against the tension of spring, 84, thereby moving it sufficiently to bring the pin, 83, out of its niche and the stud may then be rotated sufficiently to lift the pin, 83, and permit displacement of the lid.

Having thus described my invention, I claim—

1. In a tack or nail distributing machine, the combination of the tack holder or hopper, the shaft, 206, upon which the tack holder is mounted, recessed or grooved in the direction of its length whereby it is adapted to be engaged by a worm, the shaft $t$ provided with a worm wheel which drives the shaft 206, the frame work supporting the said shaft and covering the connecting gearing between them, and operating mechanism for driving the shaft $t$, substantially as set forth.

2. In a tack or nail distributing machine, the combination of the tack holder or hopper, 100, the shaft, 206, upon which the tack hopper is mounted, recessed or grooved in the direction of the length of the shaft, as shown, the shaft $t$ provided with a worm wheel which drives the shaft, 206, the shaft $h$ parallel with the shaft $t$, the connecting spur gearing between these shafts, the driving shaft, 204, connected by gearing with the shaft $h$, the frame work supporting the said shaft and covering their connecting gearing, and the distributing devices for the tacks, substantially as set forth.

3. In a machine for feeding tacks and the like, the combination of the hopper for holding a mass of tacks, the tilting pan having converging walls into which the tacks are fed from the hopper, the tack chute into which the pan delivers the tacks, a support for the pan upon which it is pivoted, and means for securing the pan to the support in the various positions to which it may be adjusted, the said parts being arranged as described whereby the inclination of the pan to the tack chute may be varied, as set forth.

4. In a tack distributing apparatus, the combination of the hopper into which a mass of tacks are placed, the chute into which the tacks are fed from the hopper, the detachable bridge block, arranged above the tack chute and having a groove in its side, and the screw, 305, adapted to engage with the said groove and hold the removable bridge block in place above the tack chute, substantially as set forth.

5. In a tack distributing apparatus, the combination with the hopper in which is placed a mass of tacks, the tack chute into which the tacks are delivered from the hopper, the detachable lid, 80, for the tack chute, and the lock or holding device for securing the said detachable lid upon the chute, consisting of a stud, 81, acted upon by the spring, 84, and provided with a pin, 83, adapted to engage with a recess in the said lid, substantially as set forth.

Signed at Boston, Massachusetts, this 1st day of November, A. D. 1890.

SHERMAN W. LADD.

Witnesses:
  JOHN TIERNEY,
  C. B. TUTTLE.